United States Patent
Itani et al.

(10) Patent No.: US 9,390,444 B2
(45) Date of Patent: Jul. 12, 2016

(54) METHOD, MEDIUM, AND SYSTEM FOR PROVIDING A SUBSET OF PRODUCTS

(75) Inventors: Ibrahim Itani, Richardson, TX (US); Muhammed Shaphy, Irving, TX (US); Yogesh Sawant, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 691 days.

(21) Appl. No.: 13/106,567

(22) Filed: May 12, 2011

(65) Prior Publication Data
US 2012/0290377 A1 Nov. 15, 2012

(51) Int. Cl.
*G06Q 30/00* (2012.01)
*G06Q 30/06* (2012.01)
*G06F 17/30* (2006.01)

(52) U.S. Cl.
CPC ...... *G06Q 30/0603* (2013.01); *G06F 17/30867* (2013.01); *G06Q 30/0627* (2013.01); *G06Q 30/0631* (2013.01)

(58) Field of Classification Search
CPC ........... G06Q 30/0631; G06Q 30/0627; G06F 17/30867
USPC ............. 705/26.1, 27.1, 26.7, 26.61; 707/754
See application file for complete search history.

(56) References Cited

U.S. PATENT DOCUMENTS

| | | | |
|---|---|---|---|
| 7,668,740 B1 * | 2/2010 | Baggett | G06F 17/30457 345/557 |
| 8,060,414 B1 * | 11/2011 | Lin | G06Q 30/06 705/26.1 |
| 8,160,929 B1 * | 4/2012 | Park | G06Q 30/00 705/26.1 |
| 2001/0044758 A1 * | 11/2001 | Talib | G06F 17/30622 705/26.1 |
| 2004/0267676 A1 * | 12/2004 | Feng | G06Q 30/0283 705/400 |
| 2008/0120174 A1 * | 5/2008 | Li | G06Q 30/02 705/14.26 |
| 2010/0131393 A1 * | 5/2010 | Pattabiraman | G06Q 30/02 705/30 |
| 2011/0022453 A1 * | 1/2011 | Dutta | G06Q 10/10 705/14.25 |

OTHER PUBLICATIONS

Feb. 2008—http://readwrite.com/2008/02/25/10_recommendation_engines.*

* cited by examiner

*Primary Examiner* — Matthew Zimmerman

(57) ABSTRACT

A product adaptor of a server receives a request from an interface application associated with the product adaptor. The request includes a request for a subset of all available products that are offered by a communication service provider. The subset of the products includes particular products that a user is permitted to purchase. The product adaptor determining whether a cache of the product adaptor stores a response that satisfies the request based on information in the request. The response includes information about the subset of the products. The product adaptor retrieves the response from the cache of the product adaptor when the cache of the product adaptor stores the response. The product adaptor further transmits the information about the subset of the products to the interface application. The interface application utilizes the information about the subset of the products to offer one or more of the particular products to the user.

20 Claims, 8 Drawing Sheets

METHOD, MEDIUM, AND SYSTEM FOR PROVIDING A SUBSET OF PRODUCTS

BACKGROUND

Communication service providers offer customers an ability to purchase a wide variety of products from different product catalogs. The products may include, for example, a subscription to a service (e.g., Internet access service) or a bundle of services. A product catalog may include multiple products that are grouped together by a communication service provider based on, for example, a shared type of the multiple products. Different product catalogs have different structures and different interfaces for accessing the products. Furthermore, a customer may purchase the products through a wide variety of ordering mechanisms, including, for example, via a website of a communication service provider accessed at a computer terminal.

As a result, currently, the communication service provider needs to be simultaneously responsive to requests for information about different products from the wide variety of ordering mechanisms and handle the different product catalogs. Accordingly, the communication service provider exerts/wastes resources continuously sorting through and dealing with an enormous amount of data associated with all of the products for each request.

DETAILED DESCRIPTION OF PREFERRED EMBODIMENTS

The following detailed description refers to the accompanying drawings. The same reference numbers in different drawings may identify the same or similar elements.

Products may refer to subscription services, applications, digital content, and/or physical products that users may purchase from a service provider (e.g., a communication service provider). A product may include, for example, a subscription to an Internet access service (e.g., dial-up Internet, fiber optic Internet, broadband Internet, etc.), a subscription to a television service (e.g., satellite television, cable television, Internet Protocol television, etc.), a subscription to a telephone service (e.g., a subscription to a plain old telephone service (POTS), a subscription to a mobile phone service, a subscription to a Voice over Internet Protocol (VoIP) service, etc.), etc. A product catalog may refer to one or more products that are grouped together by a service provider. For example, a product catalog may include products related to a particular type of service (e.g., products that are telephone services). In another example, a product catalog may include products which are sold to customers in a particular type of bundle (e.g., products sold as part of bundles of home communication services). Two or more product catalogs may include one or more of the same products. As used herein, the terms "user," "customer," and/or "subscriber," may be used interchangeably.

In one implementation, described herein, the server provider may store information about all of the products being offered by the service provider in a management server. The management server may provide information about a subset of all of the products to a product adaptor. The subset may include only qualified products. Qualified product may refer to any products, of a server provider, that the server provider determines that a customer may be interested in purchasing and the customer is allowed to purchase from the server provider. The product adaptor may store the information about the subset in a cache of the product adaptor. The product adaptor may retrieve the information about the subset from the cache instead of transmitting a request for the information about the subset to the management server.

Figure 1:
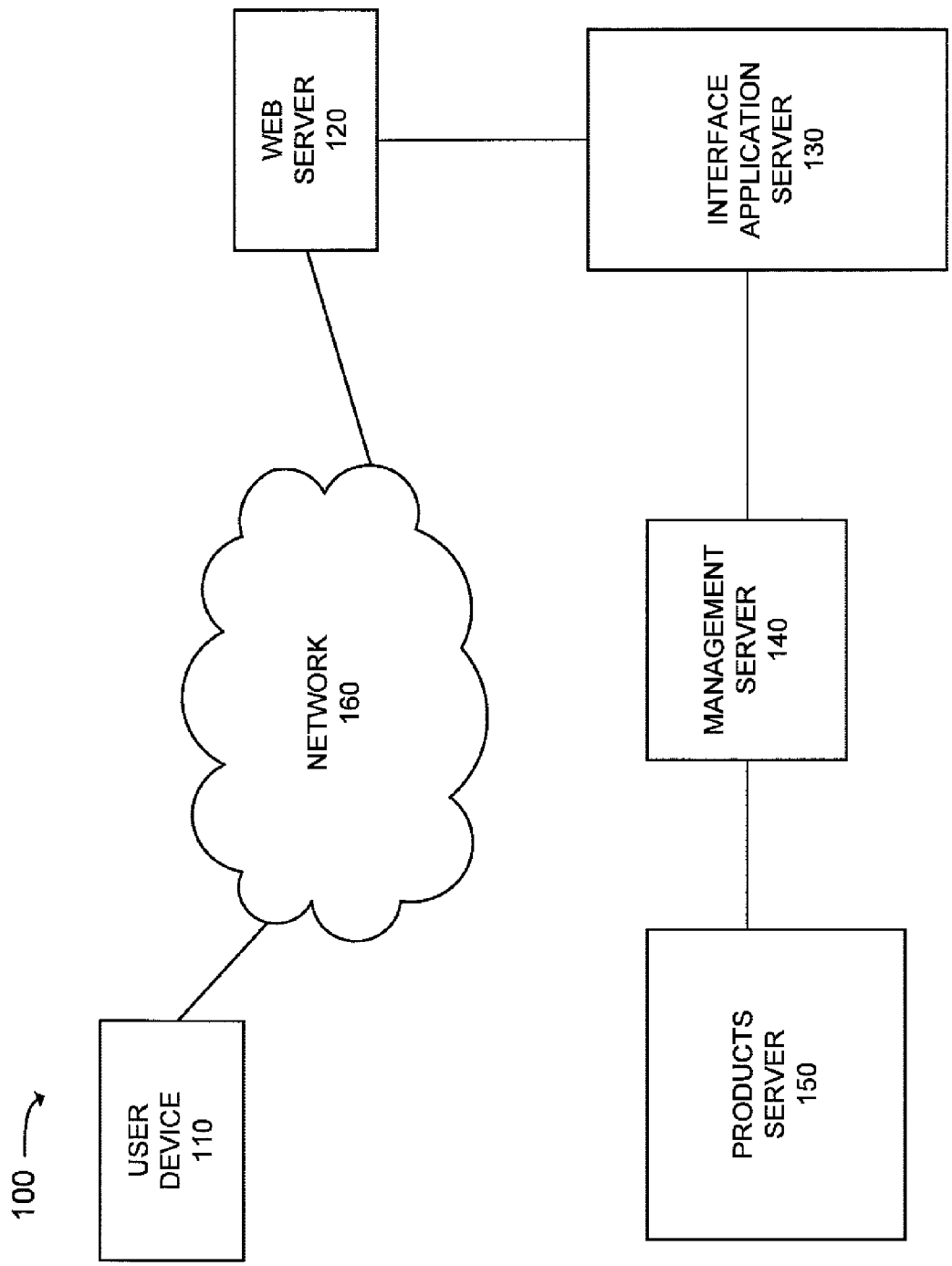
FIG. 1 is a diagram of an example environment in which systems and/or methods described herein may be implemented.

FIG. 1 is a diagram of an example environment 100 in which systems and/or methods described herein may be implemented. Environment 100 may include one or more of the following components: a user device 110, a web server 120, an interface application server 130, a management server 140, a products server 150, and a network 160. In practice, environment 100 may include additional components, fewer components, different components, or differently arranged components than are shown in FIG. 1. In some implementations, one or more of the components of environment 100 may perform one or more functions described as being performed by another one or more of the components of environment 100.

Furthermore, two or more of the components, of FIG. 1, may be implemented within a single device, or a single component may be implemented as multiple, distributed devices. Also, components of environment 100 may interconnect via wired and/or wireless connections. In other words, any two components, of environment 100, may communicate via a wired connection, a wireless connection, or a combination of a wired connection and a wireless connection.

User device 110 may include any computation or communication device, such as a communication device that is capable of communicating with web server 120 via network 160. In one implementation, user device 110 may take the form of any computer, including a web service terminal, a personal computer, a laptop, a handheld computer, a smart phone, a mobile telephone device, a personal digital assistant (PDA), a personal media player, etc., or any device capable of transmitting data to a computer. In another implementation, user device 110 may take the form of a set-top box (STB) or any other client device connected to or a part of a video display device (e.g., a television) capable of receiving and/or reproducing video and/or audio signals.

User device 110 may allow a user of user device 110 to access an interface provided by web server 120. The user may include a customer or a customer service representative who is assisting the customer. The interface may include a website, a menu, and/or any other interface that may be used for an ordering mechanism. The website/menu may prompt the user through a process for purchasing products from a communication service provider by, for example, providing recommendations and/or offers to the customer to purchase particular products. The user may utilize user device 110 to enter personal information associated with the customer (e.g., an identifier, a user name, a password, an address, etc.) and/or enter selections associated with type(s) of products that the customer is intent on (e.g., considering) purchasing. User device 110 may allow the customer to utilize user device 110 to purchase one or more products from the communication service provider.

Web server 120 may include any computation or communication device, such as a communication device that is capable of communicating with user device 110 and/or interface application server 130. Web server 120 may represent a single server device or a collection of multiple server devices and/or computer systems. Web server 120 may handle a transaction initiated by a user at user device 110. The transaction may include, for example, a request to access a website of communication service provider hosted by web server 120, a request to view available products of a communication service provider, an acceptance of an offer to purchase a particular product from the communication service provider, etc.

Web server 120 may request for a user to enter personal information and/or selection information. Web server 120 may receive the personal information and/or the selection information, and transmit the personal information and/or the selection information to interface application server 130. In response, web server 120 may receive, from interface application server 130, product information for a subset of products. Web server 120 may display the product information based on instructions from interface application server 130. Web server 120 may communicate with interface application server 130 and/or one or more other servers (e.g., a server of a third party financial services company) to process a purchase of one or more of the products by the user.

Interface application server 130 may represent a single server device or a collection of multiple server devices and/or computer systems. As described further below in reference to FIG. 3, a communication service provider may operate interface application server 130 as an interface between different ordering mechanisms that may be used to order products from the communication service provider and a source that provides information about the products. For example, interface application server 130 may receive a request for product information from web server 120, which is providing a website that may be used by a user to order products from the communication service provider. Interface application server 130 may retrieve and provide product information in response to the request. Interface application server 130 may determine how the product information is presented to the user of user device 110.

Management server 140 may represent a single server device or a collection of multiple server devices and/or computer systems. As described further below in reference to FIG. 4, a communication service provider may operate management server 140. Management server 140 may determine, in response to a request from interface application server 130, which subset of products of the communication service provider is relevant. Management server 140 may provide information about the subset of products, rules related to the subset of products, and recommendation information associated with the subset of products. Management server 140 may determine the relevant subset of products, the related rules, and the recommendation information by accepting analytical data and making heuristic and model drive decisions based on the data.

Products server 150 may represent a single server device or a collection of multiple server devices and/or computer systems. Products server 150 may maintain product catalogs for different products, different bundles (i.e., combinations of products), rules related to the different products and/or the different bundles, and/or promotions for the different products and/or the different bundles. For example, one or more of the rules may specify which different combinations of the products may be purchased by customers. Products server 150 may maintain the product catalogs by storing databases and/or having access to databases for different types of products and/or bundles. For example, products server 150 may store, in one or more databases, a catalog for voice products for customers who live within a first geographic area (e.g., East coast of the United States), a catalog for voice products for customers who live within a second geographic area (e.g., West coast of the United States), a catalog for digital television products, a catalog for Internet service products, a catalog for mobile communication products, a catalog for bundled residential products, etc.

Network 160 may include a single network, multiple networks of a same type, or multiple networks of different types. For example, network 160 may include one or more of a direct connection between devices, a local area network (LAN), a wide area network (WAN) (e.g., the Internet), a metropolitan area network (MAN), a wireless network (e.g., a general packet radio service (GPRS) network), a telephone network (e.g., a Public Switched Telephone Network or a cellular network), a subset of the Internet, an ad hoc network, a fiber optic network (e.g., a fiber optic service (FIOS) network), or any combination of the aforementioned networks. Furthermore, any direct connection, shown in FIG. 1 between components of environment 100, may include/represent connections via network 160.

Figure 2:
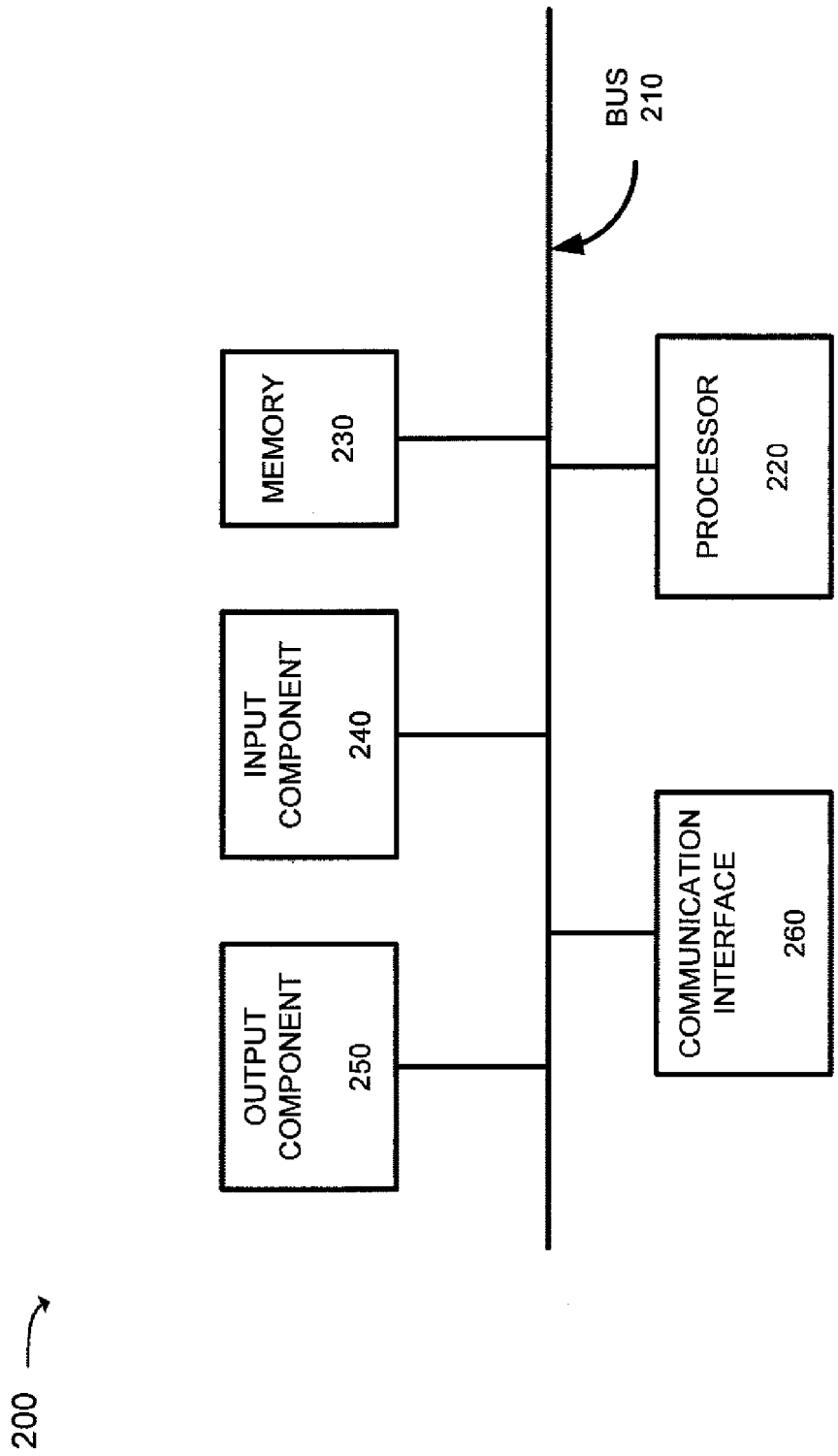
FIG. 2 is a diagram of example components of one or more of the devices of FIG. 1.

FIG. 2 is a diagram of example components of a device 200 that may be associated with user device 110, web server 120, interface application server 130, management server 140, and/or products server 150. Each one of user device 110, web server 120, interface application server 130, management server 140, and/or products server 150 may include one or more devices 200 and/or one or more of each one of the components of device 200.

As shown in FIG. 2, device 200 may include a bus 210, a processor 220, a memory 230, an input component 240, an output component 250, and a communication interface 260. In another implementation, device 200 may include additional components, fewer components, different components, and/or differently arranged components than are shown in FIG. 2. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include one or more input mechanisms that permit a user to input information to device 200. Output component 350 may include one or more output mechanisms that output information to the user. Examples of input and output mechanisms may include buttons; a touch screen interface to permit data and control commands to be input into user device 110, a speaker to receive electrical signals and output audio signals, a microphone to receive audio signals and output electrical signals, a display to output visual information (e.g., web pages, product information, etc.), etc.

Communication interface 260 may include any transceiver-like mechanism that enables device 200 to communicate with other devices and/or systems. For example, communication interface 260 may include an Ethernet interface, an optical interface, a coaxial interface, a wireless interface, or the like.

Device 200 may perform certain operations described herein. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
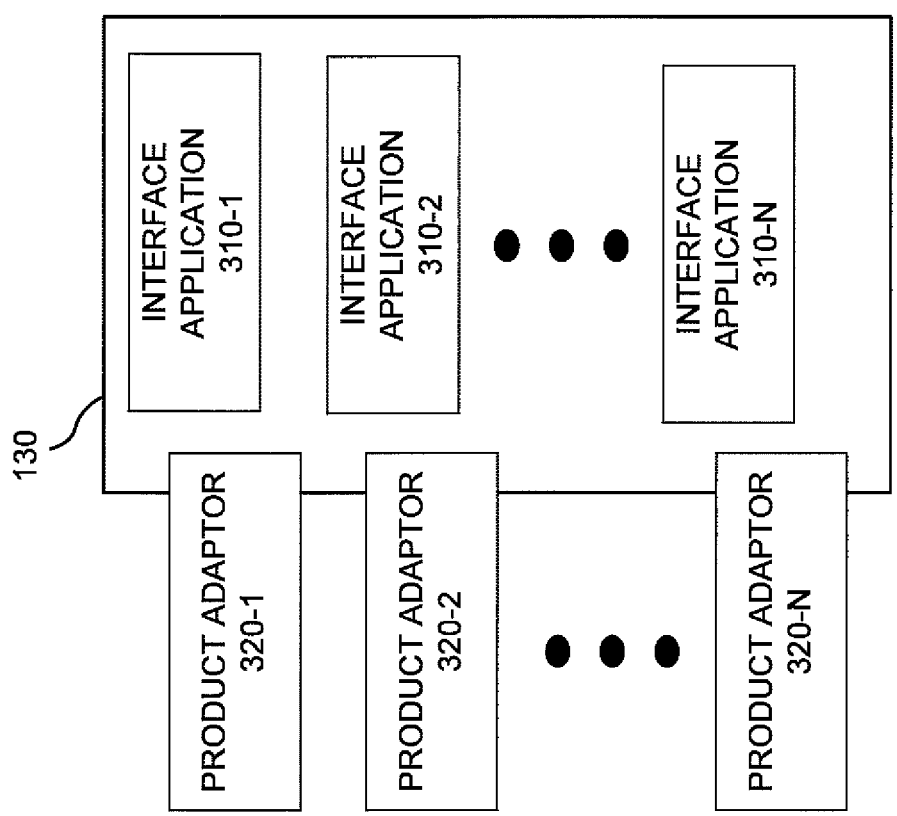
FIG. 3 is a diagram of example software/functional components of an interface application server.

FIG. 3 is a diagram of example software/functional components of interface application server 130. As shown in FIG. 3, interface application server 130 may execute interface applications 310-1, 310-2, . . . , 310-N (N≥1) (collectively referred to as "interface applications 310" and individually as "interface application 310"). Each one of interface applications 310 may correspond to a different ordering mechanism. For example, interface application 310-1 may handle a products information request for when customers access a website, of a communication server provider, for example, via desktop computers and/or laptop computers; interface application 310-2 may handle a products information request for when customers purchase products from the communication server provider via a set-top box, which is connected to a television; interface application 310-3 may handle a products information request for when customers purchase products by using a mobile phone; application 310-4 may handle a products information request for when a customer service representative, of the communication server provider, is using a portal, via a computer terminal, to assist a customer and/or a potential customer with purchasing new products from the communication server provider; etc. Interface application 310-1 may, for example, correspond to a particular web server (e.g., web server 120). Interface application 310-1 may only handle product information requests from that particular web server.

As further shown in FIG. 3, interface application server 130 may execute product adaptors 320-1, 320-2, . . . , 320-N (N≥1) (collectively referred to as "product adaptors 320" and individually as "product adaptor 320") as extensions of interface applications 310. Product adaptor 320 may act as a software extension of interface application 310. Product adaptors 320 may be instances of the same software. Accordingly, each one of product adaptors 320 may be compatible with all different interface applications 310. Each one of product adaptors 320 may correspond to a different one of interface applications 310. For example, product adaptor 320-1 may correspond to interface application 310-1, product adaptor 320-2 may correspond to interface application 310-2, etc. Product adaptor 320 may handle interactions between an interface application 310 and management server 140. Functional components of product adaptor 320 are described further below in reference to FIG. 4.

Figure 4:
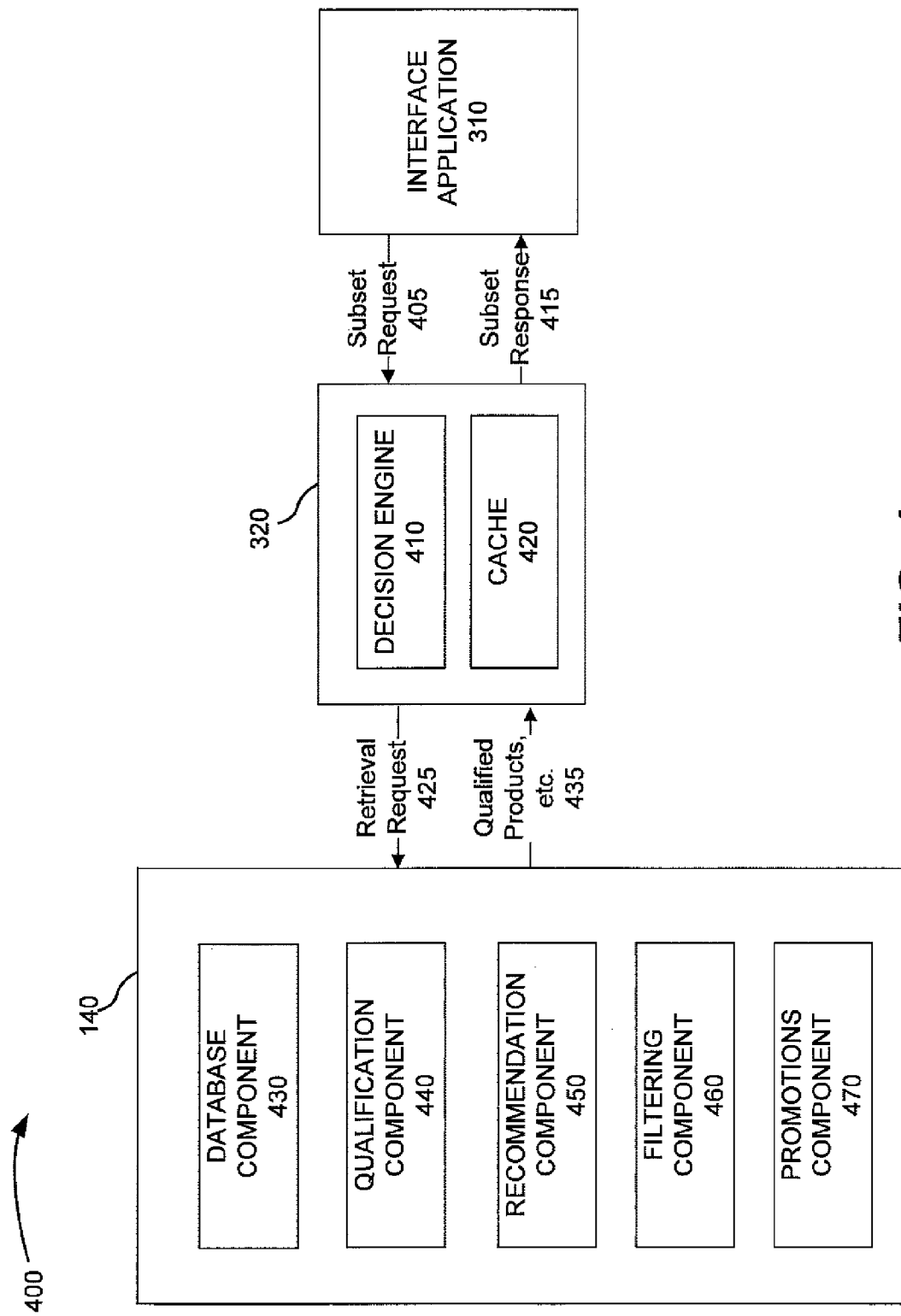
FIG. 4 is a diagram of example functional components of a product adaptor and of example functional components of a management server.

FIG. 4 is a diagram 400 of example functional components of product adaptor 320 and of example functional components of management server 140. Diagram 400 also illustrates example interactions between interface application 310, product adaptor 320, and management server 140.

Interface application 310 may receive a products information request associated with a customer. Interface application 310 may retrieve a customer profile of the customer from a database/storage device that stores information of the customer profile. Interface application 310 may generate a subset request 405 based on information in the request and the customer profile. Interface application 310 may transmit subset request 405 to product adaptor 320, which is associated with interface application 310.

Subset request 405 may include customer information associated with the customer. The customer information may include selection information, profile information associated with the customer, and/or any other relevant additional information.

The selection information may include indicators of type(s) of products that the customer is intent on (e.g., considering) purchasing. For example, the selection information may include selections made by the customer to view information about telephone services, high-speed Internet services, television services, bundles currently offered by the communication service provider, communication services for a second residence, etc.

The profile information may include, for example, demographic information of the customer, communication services information associated with the customer, purchasing history information of the customer, subscription history information of the customer, technical capabilities information of devices of the customer, etc. The demographic information may include, for example, a gender of the customer, an age of the customer, an income of the customer, an education level of the customer, an occupation of the customer, a race/ethnicity of the customer, geographic locations associated with the customer (e.g., an address of the customer, addresses of locations for which the customer has bought/wants to buy products), family information associated with the customer, etc.

The communication services information may include information about service(s) currently being provided by communication service provider(s) to the customer and/or currently being utilized by the customer (e.g., Internet Protocol (IP) television service with premium channels, cable service with on demand, fiber optic Internet service, etc.). The technical capabilities information may include information about which services (and/or types of services) the customer is able to utilize based on equipment to which the customer has access (e.g., the customer has a high definition (HD) television).

The additional information, of the customer information, may include other information that is or may be relevant for determining which subsets of products, bundles, promotions, offers, etc. are provided. In one implementation, the additional information may include an address of a location for which the customer may be considering buying new products from the communication service provider. This information may be relevant because the communication service provider may only offer particular products within limited geographic areas. In another implementation, the additional information may include an identifier (or a type) an ordering mechanism being utilized by the customer. The identifier of the ordering mechanism may be relevant because the communication service provider may allow customers to purchase particular products only through a particular ordering mechanism and/or provide particular promotions based on a type of ordering mechanism that a customer utilizes. For example, a communication service provider may only offer a promotion for a particular bundle of services via the communication service provider's website.

As shown in FIG. 4, product adaptor 320 may include a decision engine 410 and a cache 420. Product adaptor 320 may receive subset request 405 from interface application 310. Product adaptor 320 may store responses in cache 420 after product adaptor 320 receives information for the responses from management server 140. Product adaptor 320 may delete the responses stored in cache 420 on a periodic basis and/or after receiving instructions, from management server 140, to delete the responses stored in cache 420.

Decision engine 410 may determine whether cache 420 stores a response 415 that satisfies subset request 405. If decision engine 410 determines that cache 420 stores subset response 415 that satisfies subset request 405, decision engine 410 may retrieve subset response 415 from cache 420 and transmit subset response 415 to interface application 310. If decision engine 410 determines that cache 420 does not store response 415 that satisfies subset request 405, decision engine 410 may generate a retrieval request 425. In one implementation, retrieval request 425 may include the same information as subset request 405. In another implementation, decision engine 410 may determine what information from subset response 415 needs to be included in retrieval request 425 and include only that information in retrieval request 425.

Product adaptor 320 may transmit retrieval request 425 to management server 140. In response to retrieval request 425, management server 140 may transmit information regarding qualified products, rules related to the qualified products, and recommendation information 435 to product adaptor 320. Decision engine 410 may receive information regarding qualified products, rules related to the qualified products, and recommendation information 435. Decision engine 410 may generate subset response 415 based on information regarding qualified products, rules related to the qualified products, and recommendation information 435. Subset response 415 may include all of or a part of information included in qualified products, rules related to the qualified products, and recommendation information 435. Decision engine 410 may store subset response 415 in cache 420. Decision engine 410 may also transmit subset response 415 to interface application 310.

As further shown in FIG. 4, management server 140 may include one or more of the following components: a database component 430, a qualification component 440, a recommendation component 450, a filtering component 460, and/or a promotions component 470. Database component 430 may receive, from product server 150, updated products information for all the different products offered by a communication service provider. Database component 430 may receive the updated products information on a periodic basis and/or whenever products server 150 sends an update. For example, products server 150 may transmit updated product information to database component 430 after the communication service provider adds new products to a product catalog maintained by products server 150. The product information may include information for individual products, information about bundles of products which may be purchased by consumers together, promotions for the different individual products and/or the bundles of products, and/or rules related to the products, the bundles, and/or the promotions. The rules may include, for example, product rules and business rules. Product rules may specify who may buy what products and in what combinations. Business rules may specify how different products/bundles may be offered to the user (e.g., only in a bundle with particular products) and different promotions that may be utilized to sell the products/bundles.

Qualification component 440 may identify qualified products, qualified bundles, qualified promotions, and/or qualified retention/win-back offers. In other words, qualification component 440 may determine which products, bundles, promotions, and/or retention/win-back offers may be offered to a customer. Functional components of qualification component 440 are described below in reference to FIG. 5. Qualification component 440 may receive retrieval request 425. Qualification component 440 may identify the customer information, which is included in the retrieval request 425, for the customer associated with retrieval request 425. Qualification component 440 may determine, based on the customer information, which products, bundles, promotions, retention/win-back offers, etc. qualify to be offered to a customer.

Figure 5:
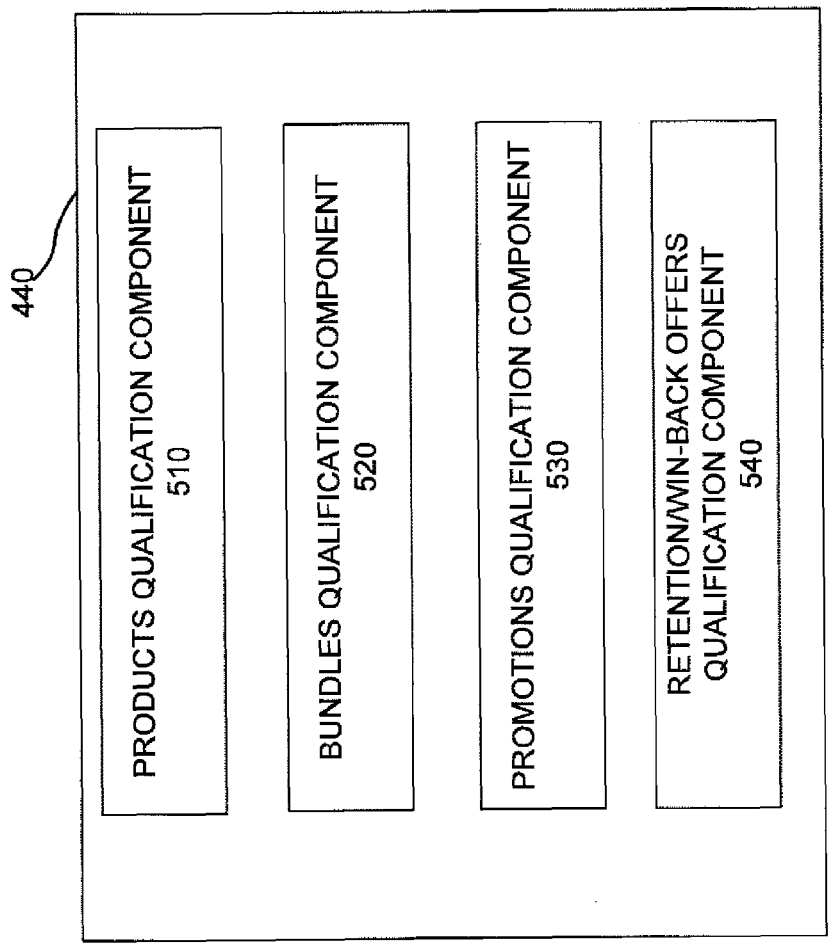
FIG. 5 is a diagram of example functional components of a qualification component of the management server.

As shown in FIG. 5, qualification component 440 may include one or more of the following components: products qualification component 510, bundles qualification component 520, promotions qualification component 530, and/or retention/win-back offers qualification component 540. Products qualification component 510 may identify qualified products out of all of the available products, and include the qualified products in the subset of products. Products qualification component 510 may determine which ones out of all of the available products are the qualified products based on the customer information, including, for example, based on the selection information and the address of the location for which the customer is considering buying product(s). For example, assume that a customer provided information that reflected their intention to buy products related to telephone services for a New York City (NYC) residence. Products qualification component 510 may identify the qualified products, in product catalogs of voice products, which are available to customers in NYC.

Bundles qualification component 520 may identify qualified bundles of all of the available bundles offered by the communication service provider. Database component 430 may store criteria associated with different bundles. The criteria may specify when a bundle may be offered. For example, a communication service provider may offer a particular bundle of basic home communication services that are provided via a fiber-optic communication network.

Criteria associated with the particular bundle may include intention criteria, geographic criteria, demographic criteria, and/or subscription history criteria. The intention criteria may specify that the particular bundle may be offered to any customer whose selection information indicates intent to buy Internet, telephone, and/or television related services. The geographic criteria may specify that the particular bundle may be offered to any customer who is buying products for a residence within one of the predefined geographic areas in which the fiber-optic communication network is available. The demographic criteria may specify, for example, that the particular bundle may be offered to any customer whose stated annual household income is not below a predefined amount (e.g., $20,000). The subscription history criteria may specify that the particular bundle may be offered to any customer who, for example, has not previously purchased the particular bundle of basic home communication services and/or who is not a current subscriber of a more expensive bundle of home communication services.

Bundles qualification component 520 may determine whether the customer meets the criteria for the bundle to be a qualified bundle. If so, bundles qualification component 520 may retrieve information about the bundle and/or information about individual products within the bundle (e.g., if the products are not already determined qualified products).

Promotions qualifications component 530 may identify qualified promotions of all promotions offered by the communication service provider. The communication service provider may offer pre-built promotions for different products and/or bundles. Promotions component 470, of FIG. 4, may adjust the promotions based on, for example, updates associated with purchases of products and/or bundles and/or popularity of the promotions. Database component 430 may store criteria associated with the promotions. The criteria may specify when a promotion may be qualified (i.e., is available to a customer). For example, criteria for a particular promotion for a particular bundle of basic home communication services may specify that for anyone for whom the particular bundle is qualified, the particular promotion may be identified as a qualified promotion (i.e., the particular promotion may be offered to all potential purchasers of the particular bundle). A promotion may include, for example, providing a discount to a customer for a product/bundle when the product/bundle is purchased within a predefined (e.g., limited) period of time; providing a discount for multiple products/bundles (e.g., for particular combinations of products/bundles) when a quantity of the multiple products is greater than a predefined number or when a total value of the multiple products is greater than a predefined amount; or providing a free bonus product to a customer, for a predefined period of time, when the customer purchases a different particular product; etc.

Retention/win-back offers qualification component 540 may identify qualified retention/win-back offers of all available retention/win-back offers by the communication service provider. In one implementation, a communication service provider may provide retention offers to current customers who are likely to end a subscription for a product/bundle of the communication service provider. In another implementation, a communication service provider may provide win-back offers to former customers who previously purchased a product/bundle from the communication service provider but are no longer subscribers of a service (or a type of the service) provided by the product/bundle or are no longer subscribers of any service of the communication service provider.

Customer information, of the customer, may include information that indicates that the customer recently filed customer service complaints where the customer indicated that they may switch to a different communication service provider. Retention/win-back offers qualification component 540 may determine, based on the aforementioned information, that the customer is a candidate for retention offers. Database component 430 may store criteria associated with retention offers. Retention/win-back offers qualification component 540 may determine which ones of the retention offers qualify to be offered to the customer. For example, criteria for a particular retention offer may specify that the retention offer may be offered to any customer who has paid more than a predefined amount on a monthly basis for the last 6 months. Retention/win-back offers may include an offer of a form of payment to a customer (e.g., in a form of a bill credit, a prepaid credit card, a gift card/certificate, etc.) in exchange for the customer agreeing to one or more predefined terms. The predefined terms may include, for example, the customer agreeing to purchase a product (e.g., customer agrees to maintain/pay for a subscription to one or more services for a predefined period of time).

Hereafter, a reference to products may also refer to bundles, promotions, and/or retention/win-back offers. Returning to FIG. 4, after qualification component 440 determines qualified products for a customer, recommendation component 450 may generate recommendation information for the qualified products. As discussed above, interface application 310 may use the recommendation information to determine how to present the qualified products to a customer in order to maximize profits of a communication service provider. The recommendation information may include different rankings of qualified products and/or any other information related to how different qualified products should be offered to the user. For example, the recommendation information may include a recommendation regarding how offers for one or more products should be positioned (e.g., in relation to each other) when the offers are presented to the customer and/or in what order the offers should be presented to the customer. The recommendation information may also include recommendations for how to present offers for the qualified products to the customer based on actions of the customer (e.g., after one or more offers for the qualified products are presented).

To generate the recommendation information, recommendation component 450 may retrieve marketing intelligence collected by the communication service provider and/or one or more third parties that collect statistics about customers of communication service providers. The marketing intelligence may include data related to maximizing profitability and/or reducing churning (i.e., reducing the rate at which customers of a communication service provider switch to another communication service provider) based on which product(s) are offered to customers. The marketing intelligence may be correlated to data included in the customer information. For example, the marketing intelligence may be correlated to demographic information of the customer, geographic locations associated with the customer and/or a potential purchase, communication services currently being utilized by the customer, purchasing history of the customer, technical capabilities of devices of the customer, an ordering mechanism being utilized by the customer, etc. Recommendation component 450 may generate the recommendation information, for the subset of products, based on the marketing intelligence and the customer information.

In another implementation, the marketing intelligence may be correlated to an index. Recommendation component 450 may calculate a value on the index for the customer, based on the purchasing history of the customer information, by using a particular formula. For example, the marketing intelligence may indicate that a customer with a value, on the index, above a predefined threshold is more likely to buy a bundle of products when the bundle of products is offered to the costumer before a particular individual product is presented to the customer. Accordingly, in this example, recommendation component 450 may generate recommendation information that includes a recommendation to offer the bundle of products to the customer before offering the particular individual product.

While qualification component 440 identifies the qualified products to include in the subset of products, qualification component 440 may retrieve related rules, from database component 430, that are related to the qualified products. Filtering component 460 may eliminate unnecessary rules from the related rules based on the customer information and the qualified products. In one implementation, filtering component 460 may eliminate, from the related rules, any rules that do not apply because of information related the customer. For example, filtering component 460 may eliminate rules that specify that a California resident cannot be sold particular combinations of the qualified products when the customer is not a California resident. In another implementation, filtering component 460 may eliminate, from the related rules, any rules that are not applicable because of the particular qualified products that are actually in the subset of products. For example, a rule may state that a first qualified product may not be purchased by the customer in combination with a second non-qualified product. Since the second non-qualified product is not in the subset of products, the rule is not applicable. Accordingly, filtering component 460 may eliminate the rule from the related rules.

Promotions component 470 may store information about different promotions for products and/or bundles. The communication server provider may add pre-built promotions to promotions component 470 and/or remove from promotions component 470. The communication server provider may allow promotions component 470 to adjust one or more of the pre-built promotions based on, for example, updates associated with purchases of products and/or bundles and/or popularity of the promotions. For example, promotions component 470 may receive information that indicates that a particular promotion is not popular with customers of the communication service provider. Promotions component 470 may, for example, improve the particular promotion by lowering a price (e.g., by increasing a discount) associated with the promotion.

Management server 140 may transmit the qualified products, related rules, and recommendation information 435 to product adaptor 320. As discussed above, decision engine 410 may generate subset response 415 based on the received qualified products, related rules, and recommendation information 435. Product adaptor 320 may transmit subset response 415 to interface application 310. Interface application 310 may determine how to present the qualified products to the user based on the recommendation information. Interface application 310 may determine whether the user may buy two or more of the qualified products based on the related rules.

Figure 6:
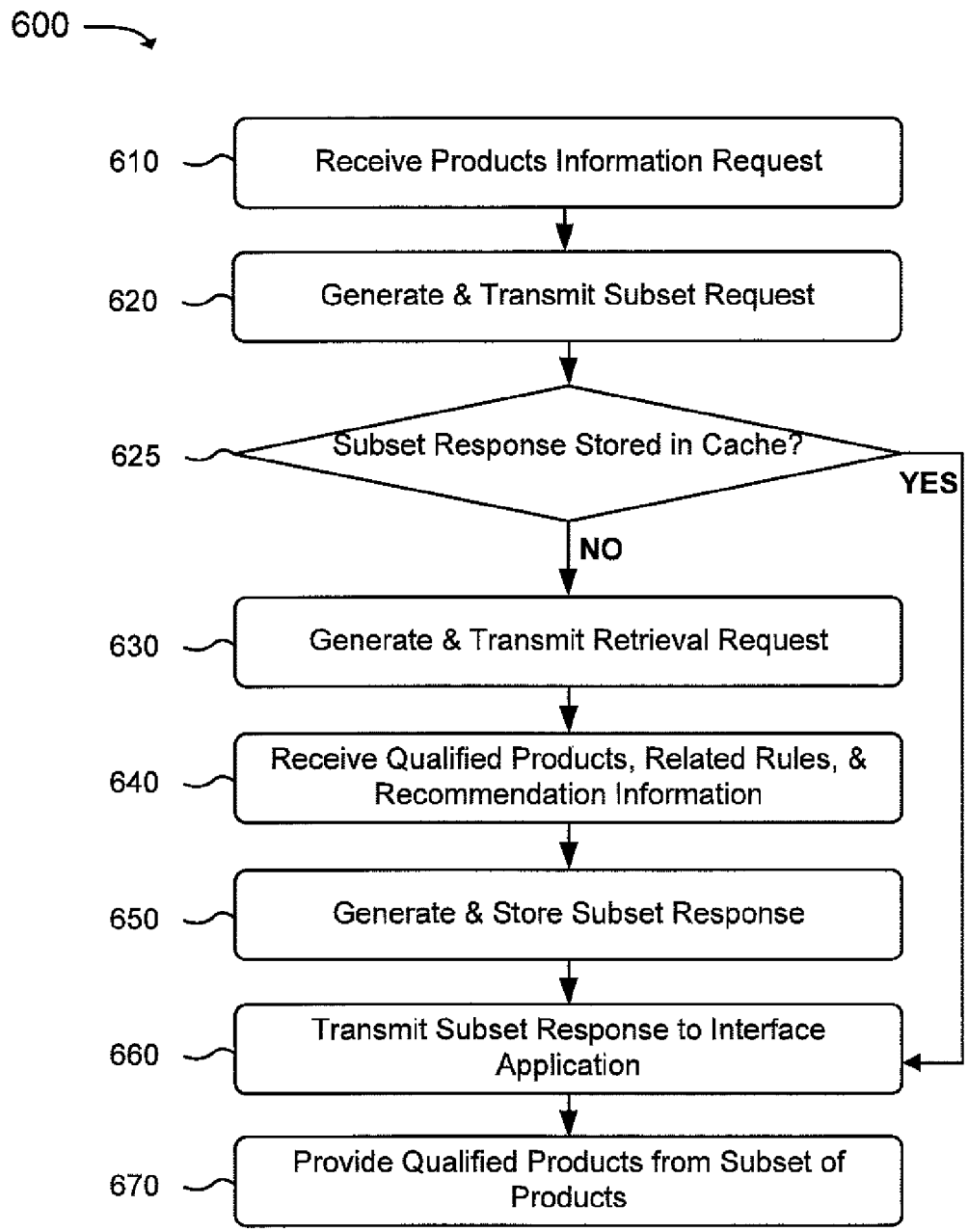
FIG. 6 is a flowchart of an example process for providing a subset of products.

FIG. 6 is a flowchart of an example process 600 for providing a subset of products. In one implementation, interface application server 130 may perform process 600. In another implementation, a device or collection of devices separate from, or in combination with, interface application server 130 may perform some or all of process 600. FIG. 6 is described below with reference to FIGS. 1 and 4.

As show in FIG. 6, process 600 may include receiving a products information request (block 610). For example, a user may utilize user device 110 to access a website, hosted by web server 120, of a service provider. The user may select an icon on the website to obtain information about, for example, Internet services provided by the service provider. The website may prompt the user to enter an address of where the user would like the Internet service. The website may prompt the user to enter identity information (e.g., user ID and password, phone number, etc.) associated with the user. Web server 120 may generate a products information request based on the selection, the address, and the identity information. Web server 120 may transmit the products information request to interface application server 130. Interface application server 130 may execute interface application 310, which is dedicated to handling requests from web server 120. Interface application 310 may receive the products information request.

A subset request may be generated and transmitted (block 620). Interface application 310 may determine an identifier of the user based on the identity information in the products information request. Interface application 310 may retrieve a user profile corresponding to the identifier. The user profile may include profile information, which includes demographic information, communication services information, purchasing history information, subscription history information, and/or technical capabilities information associated with the user. The profile information is collected and used by the communication service provider with the user's permission. Interface application 310 may select one or more pieces of the profile information to include in a subset request. For example, interface application 310 may select from the user profile, to include in the subset request, information regarding an income of the user, communication services information associated with the user, and subscription history information.

Interface application 310 may determine, based on the address in the products information request, a particular area that includes a location where the user would like the Internet service. For example, the address may specify a mailing address (e.g., "1600 Pennsylvania Ave NW, Washington, D.C., 20037") or only a zip code (e.g., "20037"). Based on the address, interface application 310 may determine that the user would like the Internet service in a particular predefined area (e.g., "Northwest, Washington, D.C."). The service provider may define areas, for example, based on where similar services of the service provider are available. Interface application 310 may generate the subset request based on the selected pieces of the profile information, the predefined area, and the selection of the user (e.g., "Internet service"). Interface application 310 may transmit the subset request to product adaptor 320.

Whether a subset response is stored in a cache may be determined (block 630). Decision engine 410 of product adaptor 320 may receive the subset request. Decision engine 410 may retrieve the profile information, the predefined area, and the selection of the user from the received subset response. In one implementation, decision engine 410 may determine whether cache 420, of product adaptor 320, stores a subset response that satisfies the received subset request by determining whether a stored subset response was previously generated for a previous subset request with similar profile information, predefined area, and selection as of the received subset request. Decision engine 410 may determine which one or more other pieces of the profile information and/or the predefined area are relevant based on the selection.

In one example, decision engine 410 may determine that only communication services information associated with the user, of the profile information, and the predefined area are relevant for providing information about products related to Internet services. Decision engine 410 may determine whether cache 420, of product adaptor 320, stores a subset response that satisfies the received subset request by determining whether a stored subset response was previously generated for a previous subset request with the same communication services information, predefined area, and selection as of the received subset request.

In another example, decision engine 410 may determine that only salary information, of the profile information, is relevant for providing information about products related to Internet services. Assume that the subset request specifies that the income of the user is $27,000. Decision engine 410 may determine that the relevant income range is, for example, $15,000-$45,000 when users with incomes that fall within the relevant income range are offered a particular subset of the products related to Internet services. Here, decision engine 410 may determine whether cache 420, of product adaptor 320, stores a subset response that satisfies the received subset request by determining whether a stored subset response was previously generated for a previous subset request that specified an income that was within the relevant income range and Internet services as the selection.

If decision engine 410 determines that cache 420 stores a subset response that satisfies the subset request (block 625—YES), the subset response may be transmitted to interface application 310 (block 660). For example, decision engine 410 may retrieve, from cache 420, the subset response that complies with the subset request. As a result, the communication service provider does not waste resources by sorting through and dealing with information about all products offered by the communication service provider and all rules related to the products to generate the subset response. The communication service provider further does not waste resources by formatting information for the subset response based on a particular type of ordering mechanism associated with interface application 310. Product adaptor 320 may transmit the subset response to interface application 310, as described further below.

If decision engine 410 determines that cache 420 does not store a subset response that satisfies the subset request (block 625—NO), a retrieval request may be generated and transmitted (block 630). For example, product adaptor 320 may generate a retrieval request based on the subset request. In one implementation, product adaptor 320 may include all of the information from the subset request in the retrieval request. In another implementation, decision engine 410 may determine which one or more other pieces of the profile information and/or the predefined area are relevant for retrieving a subset of products for the selection. Product adaptor 320 may include only information based on the selection and the relevant pieces in the retrieval request. Product adaptor 320 may forward the generated retrieval request to management server 140. In yet another implementation, product adaptor 320 may forward the subset request as the retrieval request to management server 140.

Qualified products, related rules, and recommendation information may be received (block 640). For example, as described further below in reference to FIG. 7, management server 140 may store information about all products offered by the service provider. Management server 140 may identify qualified products to include in the subset of the products based on information included in the retrieval request, including, for example, the profile information, the predefined area, and the selection. Further to the example above, the qualified products may only include subscriptions to Internet services that are available in Northwest, Washington, D.C. (assuming that the profile information does not disqualify any of the products). Management server 140 may also retrieve rules related to the qualified products. Management server 140 may eliminate any unnecessary rules from the related rules based on a makeup of the qualified products and/or based on the information included in the retrieval request. Management server 140 may also generate recommendation information for the qualified products based on marketing intelligence and the information included in the retrieval request. Management server 140 may transmit information about the qualified products, the related rules, and the recommendation information to product adaptor 320. Product adaptor 320 may receive the qualified products, the related rules, and the recommendation information.

A subset response may be generated and stored (block 650). Decision engine 410, of product adaptor 320, may receive the qualified products, the related rules, and the recommendation information. Decision engine 410 may generate a subset response based on the qualified products, the related rules, and the recommendation information. In another implementation, decision engine 410 may modify or select a part of the qualified products, the related rules, and the recommendation information for the subset response based on interface application 310 9 e.g., based on a type of user device 110 that is used to access information provided by interface application 310). For example, the recommendation information may include a recommendation to display videos for five of the qualified products at one time. Assume that user device 110 is a mobile phone and that web server 120 is a web server that provides a mobile version of the website of the communication service provider. Interface application 310 would not use the recommendation because the recommendation is not suitable for web server 120 (e.g., because user device 110 cannot handle displaying five videos at one time). Accordingly, decision engine 410 may not include the recommendation in the subset response. After generating the subset response, decision engine 410 may store the subset response in cache 420 in association with a part of data included in the subset request (e.g., profile information, predefined area, and/or selection). The part of data is information that is necessary for decision engine 410 to properly locate the stored subset response for possibly satisfying a subsequent subset request.

A subset response may be transmitted to an interface application (block 660). For example, product adaptor 320 may transmit the subset response to interface application 310. Qualified products from a subset of products may be provided (block 670). For example, interface application 310 may receive the subset response from product adaptor 320. Interface application 310 may retrieve the qualified products and the recommendation information from the subset response. Interface application 310 may generate instructions based on the recommendation information. Interface application 310 may transmit the instructions to web server 120. The instructions may direct web server 120 to send information to user device 110 for user device 110 to display the information about one or more of the qualified products. Web server 120 may comply with the instructions, and the user may obtain information about the qualified products on a display of user device 110. The user may perform follow-up actions by utilizing user device 110. Web server 120 may transmit information about the follow-up actions to interface application 310. Interface application 310 may receive the information about the follow-up actions. In response to the information about the follow-up actions, interface application 310 may transmit new instructions for displaying information about one or more of the qualified products. Interface application 310 may not need to interact with any other device or component (besides web server 120) unless the user requests information related to products that are not included in the qualified products of the subset.

Further to the example above, interface application 310 may transmit instructions for user device 110 to display an icon for wireless Internet service, an icon for residential Internet service, and an icon for residential Internet service (herein, "the three icons"). Web server 120 may receive the instructions and transmit information to user device 110 for user device 110 to display the three icons. The user of user device 110 may obtain the three icons on a display of user device 110. Assume that the user selects the icon for residential Internet service. Web server 120 may transmit information that the user selected the icon for residential Internet service to interface application 310. In response, interface application 310 may transmit instructions for web server 120 to transmit information to user device 110 for user device 110 to display an icon for high speed Internet service and an icon for fiber optic Internet service (herein, "the two icons"). Web server 120 may receive the instructions and transmit information to user device 110 for user device 110 to display the two icons.

The user of user device 110 may obtain the two icons on the display of user device 110. Assume that the user selects the icon for high speed Internet service. Web server 120 may transmit information that the user selected the icon for high speed Internet service to interface application 310. Interface application 310 may retrieve information about different products related to high speed Internet service from the subset of the qualified products. Interface application 310 may transmit instructions for web server 120 to transmit information to user device 110 for user device 110 to display the information about the different products. Web server 120 may receive the instructions and transmit information to user device 110 for user device 110 to display the information about the different products.

The user of user device 110 may obtain the information about the different products on the display of user device 110. Thereafter, the user may utilize user device 110 to select an icon to obtain information about, for example, telephone services provided by the service provider. Web server 120 may transmit information about the action (i.e., the selection of the icon to obtain information about telephone services) to interface application 310. Interface application 310 may determine that the subset of the qualified products does not include products related to telephone services. Accordingly, interface application 310 may generate and transmit a new subset request based on the new selection of the user (e.g., "telephone service"), as described above in reference to block 620.

Figure 7:
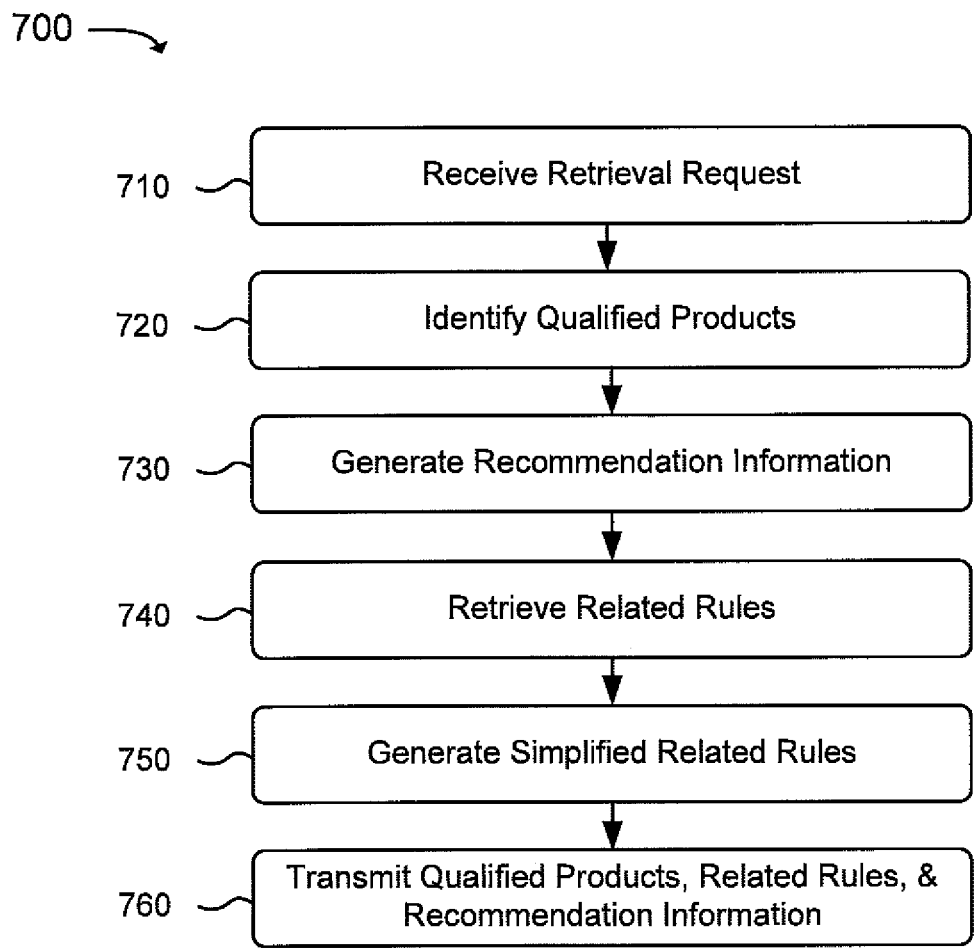
FIG. 7 is a flowchart of an example process for providing products from a subset of products.

FIG. 7 is a flowchart of an example process 700 for determining a subset of products. In one implementation, management server 140 may perform process 700. In another implementation, a device or collection of devices separate from, or in combination with, management server 140 may perform some or all of process 700.

Process 700 may include receiving a retrieval request (block 710). For example, as described above, management server 140 may receive a retrieval request from product adaptor 320. The retrieval request may include selection information, profile information, location information, and/or any other relevant information (e.g., a type of ordering mechanism). Assume that a user selected to obtain information about bundles of communication services for a business. The retrieval request may include, for example, selection information (e.g., business bundles), a size of the business (e.g., a medium business), and location information (e.g., NY City).

Qualified products may be identified (block 720). Management server 140 may maintain and/or have access to information about products provided by a service provider. Management server 140 may also store criteria for each one of the products. The criteria may specify who is allowed to purchase the products and for what purpose. The user may only purchase a qualified product. Management server 140 may identify qualified products based on the criteria and data of the retrieval request (i.e., by determining whether the data of the retrieval request matches the criteria). Assume that the service provider offers a first product which is a bundle of residential communication services, a second product which is a bundle of business communication services for large businesses, etc. Further to the example above, the qualified products include only bundles of communication services for medium-sized business that are available in NY City.

Recommendation information may be generated (block 730). For example, management server 140 may retrieve marketing intelligence for determining recommendation information. Management server 140 may generate recommendation information, regarding presenting offers for the qualified products, based on the marketing intelligence and the data of the retrieval request. Assume that the marketing intelligence indicates that medium sized businesses in NY City are most likely to buy standard bundles of communication services that include a voice service and an Internet service. Further assume that the marketing intelligence indicates that medium sized businesses in NY City are likely to purchase a more expensive bundle of services that include a voice service, an Internet service, and a conferencing service if they are presented with an offer to purchase the more expensive bundle of services before being presented with the offer to purchase the standard bundle. In the example above, management server 140 may generate recommendation information that includes a ranking that ranks qualified products that include the more expensive bundles of services before the qualified products that include the standard bundles of services. The recommendation information may further include a recommendation to present offers for qualified products in the order of the ranking.

Related rules may be retrieved (block 740). For example, management server 140 may maintain rules related to the products. Management server 140 may retrieve the rules related to the qualified products. In another implementation, when a qualified product is a bundle of products, management server 140 may also retrieve rules related to each one of the products in the bundle.

Simplified related rules may be generated (block 750). For example, management server 140 may generate simplified related rules by eliminating unnecessary rules and/or by combining rules. Management server 140 may identify unnecessary rules based on a composition of the qualified products and/or based on the data in the retrieval request. Assume that the related rules include, for example, a first rule that a customer cannot buy a first bundle if the customer is currently a subscriber to one of the services in the first bundle, a second rule that a customer cannot buy the first bundle and a second bundle at one time for a location in California, etc. Management server 140 may eliminate the first rule because the qualified products do not include the second bundle and/or because the location is not in California. Management server 140 may combine two or more of the related rules when a management server 140 can express the rules in a single rule and/or when one rule of the two or more rules already covers the other rules of the two or more rules. Assume that the related rules include rules like the first rule for each bundle. Management server 140 may combine all the rules like the first rule into a single rule that specifies that a customer cannot buy any particular bundle if the customer is currently a subscriber to one of the services in the particular bundle.

Qualified products, related rules, and recommendation information may be transmitted (block 760). For example, after identifying the qualified products, generating the recommendation information, and/or generating the simplified related rules, management server 140 may transmit information about the qualified products, the recommendation information, and/or the simplified related rules to product adaptor 320.

Figure 8:
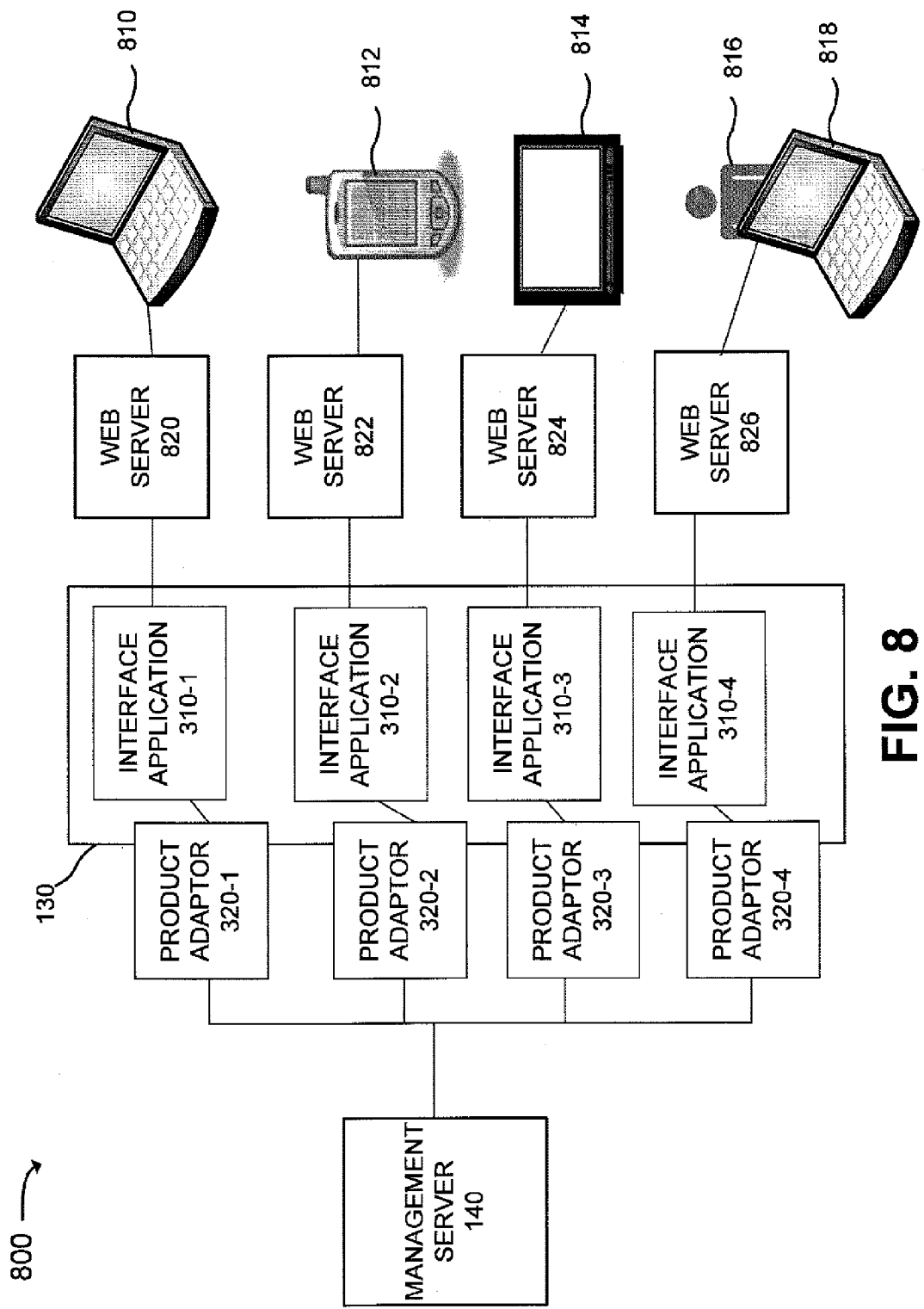
FIG. 8 illustrates an example of providing a subset of products.

FIG. 8 illustrates an example 800 of providing a subset of products. A user may purchase products, from a service provider, through a wide variety of ordering mechanisms. The ordering mechanisms may include, for example, a website of a service provider accessed at a computer terminal 810, a mobile phone 812 of the user, a television set 814 (e.g., that includes an STB) of the user, and/or a third party 816 (e.g., a customer service representative of the service provider) contacted by the user. The user may contact third party 816 by calling, emailing, etc. third party 816.

Each one of computer terminal 810, mobile phone 812, television set 814, third party 816 may receive information about different products being offered by the service provider from web server 820, web server 822, web server 824, and web server 826, respectively, of the service provider. The service provider may configure/dedicate each one of web server 820, web server 822, web server 824, and web server 826 to provide the information about different products to only one or more particular types of ordering mechanisms. Each one of web server 820, web server 822, web server 824, and web server 826 may represent multiple servers. Third party 816 may receive information from web server 826 via a third party computer terminal 818. In one implementation, web server 826 may include third party computer terminal 818.

Assume that in example 800a user accesses a website of the service provider by using computer terminal 810. Web server 820 may host the website. The user may use the website to initiate a process of purchasing products from the service provider. Web server 820 may receive information entered by the user, while using the website, at computer terminal 810. The information may include user information (e.g., username and password), an address of a location for which the user want to purchase products, a type of product the user wants to purchase, etc.

Each one of interface application 310-1, interface application 310-2, interface application 310-3, and interface application 310-4 may handle only requests from web server 820, web server 822, web server 824, and web server 826, respectively (i.e., requests prompted by users using a particular ordering mechanism and not requests prompted by users using any other ordering mechanisms).

In example 800, web server 820 may transmit a request for information about products, based on the information provided by the user, to interface application server 310-1. Interface application 310-1 may receive the request from the web server 820. Interface application 310-1 may retrieve a user profile of the user. Interface application 310-1 may generate a subset request based on the information in the request and the user profile.

Each one of interface application 310-1, interface application 310-2, interface application 310-3, and interface application 310-4 may interact with management server 140 via one of product adaptor 320-1, product adaptor 320-2, product adaptor 320-3, and product adaptor 320-4, respectively. Management server 140 may store or have access to information about all products that users may purchase from the service provider. Management server 140 may receive the information about all the products from a product server and/or one or more other sources on a periodic basis (e.g., daily). Each one of product adaptor 320-1, product adaptor 320-2, product adaptor 320-3, and product adaptor 320-4 may include a separate cache that stores responses based on previous subset requests. The responses may include information about a subset of the products. Product adaptors 320 may determine whether it is necessary to waste resource of management server 140, based on the responses stored in their respective caches, before interacting with management server 140 in response to requests from interface applications 310.

In example 800, interface application 310-1 may transmit the subset request to product adaptor 320-1. Product adaptor 320-1 may facilitate interactions between interface application 310-1 and management server 140. Before doing so in response to the subset request, product adaptor 320-1 may determine whether a cache of product adaptor 320-1 stores a response that satisfies the subset request. Product adaptor 320-1 may have stored the response after receiving a previous subset request. If product adaptor 320-1 determines that the cache stores the response that satisfies the subset request, product adaptor 320-1 may transmit the response to interface application 310-1.

The response may include information about a subset of the products, rules related only to the subset of the products (i.e., no extra, unnecessary, rules), and/or recommendation information. Recommendation information may include, for example, different rankings of qualified products that make up the subset of the products, recommendations for presenting, to the user, offers for one or more of the qualified products, recommendations for using promotions for one or more of the qualified products, and/or any other information related to how the qualified products should be offered to the user. Interface application 310-1 may generate instructions based on the information about the subset of the products and the recommendation information. The instructions may direct web server 820 to transmit offer information about one or more of the offers to user device 810 for user device 810 to display the offer information.

If product adaptor 320-1 determines that the cache of product adaptor 320-1 does not store a response that satisfies the subset request, product adaptor 320-1 may transmit a retrieval request to management server 140. Management server 140 may determine which products are qualified to be included in a subset of the products. Management server 140 may retrieve information about the qualified products from storage of management server 140 or from a storage device connected to management server 140. Management server 140 may generate recommendation information for the qualified products. Management server 140 may also eliminate any unnecessary information before transmitting the subset of products to product adaptor 320-1, including eliminating unnecessary rules that are unrelated to the qualified products.

The rules may specify, for example, business and technical rules related to products that customers may purchase at one time and/or together (e.g., in a bundle). The rules may include, for example, a first rule that the user cannot select to purchase a first product of the qualified products without selecting to purchase a second product of the qualified products, a second rule that the user cannot purchase, at one time, a third product of the qualified products and a fourth product of the qualified products, etc. Interface application 310-1 may use the rules after receiving, from web server 820, (information about) follow-up actions performed by the user at computer terminal 810. The follow-up actions may include a selection of one or more of the qualified products.

Returning to example 800, management server 140 may transmit the information about the subset of the products, the rules related to the qualified products, and/or the recommendation information to product adaptor 320-1. Product adaptor 320-1 may transmit a subset response, based on the information about the subset of the products, the rules related to the qualified products, and/or the recommendation information, to interface application 310-1. Product adaptor 320-1 may store the subset response in the cache of product adaptor 320-1. Thereafter, whenever the user or a different user uses the website, of web server 820, to request information associated with the subset of the products, product adaptor 320-1 may provide the information from the subset of the products without having to interact with management server 140. As discussed above, interface application 310-1 may provide instructions, related to displaying the requested information and based on the recommendation information, to web server 820. Web server 820 may transmit information to computer terminal 810 in response to the instructions.

The foregoing description provides illustration and description, but is not intended to be exhaustive or to limit the embodiments to the precise form disclosed. Modifications and variations are possible in light of the above teachings or may be acquired from practice of the embodiments.

While series of blocks have been described with regard to FIGS. 6 and 7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for processing requests differently based on technical capabilities of requesting devices, the method comprising:
    receiving, by a first interface application of a plurality of interface applications of a server, a request that includes identity information associated with a user of a user device of the requesting devices,
        the plurality of interface applications including the first interface application and a second interface application,
        the first interface application being associated with a first type of one or more first devices of the requesting devices,
            the one or more first devices including the user device,
        the second interface application being associated with a second type of one or more second devices of the requesting devices, and
        the second type being different from the first type;
    determining, by the first interface application of the server, technical capabilities associated with the user based on the identity information associated with the user of the user device;
    generating, by the first interface application of the server, a subset request based on the technical capabilities associated with the user,
        the subset request including:
            first information identifying one or more types of products that are offered by a communication service provider, and
            second information including information identifying the technical capabilities associated with the user;
    sending, by the first interface application of the server, the subset request to a product adaptor of the server;
    receiving, by the product adaptor of the server, the subset request from the first interface application;
    determining, by the product adaptor of the server and based on the subset request, that a cache of the product adaptor stores a response that includes information about a subset of products that are compatible with the technical capabilities associated with the user;
    retrieving, by the product adaptor of the server, the response from the cache of the product adaptor based on determining that the cache of the product adaptor stores the response; and
    transmitting, by the product adaptor of the server, the information about the subset of the products to the first interface application,
        the first interface application utilizing the information about the subset of the products to offer one or more products, in the subset of the products, to the user.

2. The method of claim 1, further comprising:
    receiving, by the product adaptor of the server, another request from the first interface application;
    determining, by the product adaptor of the server, that the cache of the product adaptor does not store any response that satisfies the other request;
    transmitting, by the product adaptor of the server and based on the other request, a retrieval request for other information about another subset of the products after determining that the cache of the product adaptor does not store any response that satisfies the other request; and
    receiving, by the product adaptor of the server, the other information about the other subset of the products as a response to the retrieval request.

3. The method of claim 1, further comprising:
    generating, after receiving the information about the subset of the products, the response based on the information about the subset of the products; and
    storing the response in the cache of the product adaptor.

4. The method of claim 1, where the products comprise subscriptions for at least two of:
    a telephone service,
    an Internet service,
    a television service, or
    a bundle of two or more different services.

5. The method of claim 1,
    where the information about the subset of the products comprises:
        information about the one or more products, and
        recommendation information, and
    where the method further comprises:
        generating, by the first interface application of the server, instructions based on the information about the one or more products and the recommendation information,
            the instructions controlling presentation of the information about the one or more products when the one or more products are offered, and
        transmitting, by the first interface application of the server, the instructions to a web server connected to the user device.

6. The method of claim 5,
    where the recommendation information comprises recommendations about how to present offers for the one or more products, and where the instructions direct the web server to send offer information about the offers to the user device for presentation on the user device.

7. The method of claim 1,
where the information about the subset of the products further comprises:
   information about the one or more products, and
   rules related to the one or more products, and
where the method further comprises:
   receiving, by the first interface application of the server, information identifying follow-up actions performed at the user device after the user device presents an offer for the one or more products,
   generating, by the first interface application of the server, instructions based on the follow-up actions and the rules related to the one or more products, and
   transmitting, by the first interface application of the server, the instructions to a web server connected to the user device,
      the instructions directing the web server to send the information about the one or more products to the user device.

8. The method of claim 7,
where the follow-up actions comprise a selection of one or more of the one or more products, and
where the rules comprise one or more of:
   a first rule that the user cannot select to purchase a first product of the one or more products without selecting to purchase a second product of the one or more products, or
   a second rule that the user cannot purchase, at one time, both a third product of the one or more products and a fourth product of the one or more products.

9. One or more non-transitory computer-readable media storing instructions for processing requests differently from technical requesting devices, the instructions comprising:
   one or more instructions that, when executed by one or more processors, cause the one or more processors to:
      receive, using a first interface application of a plurality of interface applications, a request that includes identity information associated with a user of a user device of the requesting devices,
         the plurality of interface applications including the first interface application and a second interface application,
         the first interface application being associated with a first type of one or more first devices of the technical requesting devices,
            the one or more first devices including the user device,
         the second interface application being associated with a second type of one or more second devices of the technical requesting devices, and
         the second type being different from the first type;
      determine, using the first interface application, technical capabilities associated with the user based on the identity information associated with the user of the user device;
      generate, by the first interface application, a subset request based on the technical capabilities associated with the user,
         the subset request including:
            first information identifying one or more types of products that are offered by a communication service provider, and
            second information including information identifying the technical capabilities associated with the user;
      send, from the first interface application and to a product adaptor, the subset request;
      receive, using the product adaptor, the subset request from the first interface application;
      determine, based on the subset request, that a cache stores information regarding a subset of products that are compatible with the technical capabilities associated with the user;
      retrieve the information regarding the subset of the products based on determining that the cache stores the information regarding the subset of the products that are compatible with the technical capabilities associated with the user; and
      transmit the information regarding the subset of the products to the first interface application.

10. The one or more non-transitory computer-readable media of claim 9, where the instructions further comprise:
   one or more instructions that, when executed by the one or more processors, cause the one or more processors to:
      receive another request from the application;
      determine that the cache does not store other information regarding another subset of the products that satisfies the other request;
      transmit a retrieval request for the other information regarding the other subset of the products that satisfies the other request to a server based on determining that the cache does not store the other information regarding the other subset of the products that satisfies the other request; and
      receive, as a response to the retrieval request, the other information regarding the other subset of the products.

11. The one or more non-transitory computer-readable media of claim 9,
where the user is a customer or a third party assisting the customer, and
where the customer is one of a potential customer, a current subscriber to one or more services of the communication service provider, or a former subscriber to one or more services of the communication service provider.

12. The one or more non-transitory computer-readable media of claim 9, where the subset request further comprises:
   an address of a geographic location associated with the user.

13. The one or more non-transitory computer-readable media of claim 12, where the subset of the products comprise only products that are available at the geographic location.

14. The one or more non-transitory computer-readable media of claim 9,
where the user uses the user device to interact with an ordering mechanism that interfaces with the first interface application, and
where the user device is separate from a server that includes the first interface application and the product adaptor.

15. A system for processing requests differently from technical requesting devices, the system comprising:
   one or more processors to:
      receive, using a first interface application of a plurality of interface applications, a request that includes identity information associated with a user of a user device of the requesting devices,
         the plurality of interface applications including the first interface application and a second interface application, the first interface application being associated with a
first type of one or more first devices of the technical requesting devices,
the one or more first devices including the user device,
the second interface application being associated with a second type of one or more second devices of the technical requesting devices, and
the second type being different from the first type;
determine, using the first interface application, technical capabilities associated with the user based on the identity information associated with the user of the user device;
generate, by the first interface application, a subset request based on the technical capabilities associated with the user,
the subset request including:
first information identifying one or more types of products that are offered by a communication service provider, and
second information including information identifying the technical capabilities associated with the user;
send, from the first interface application and to a product adaptor, the subset request;
determine, using the product adaptor and based on the subset request, that a cache stores a response that includes information regarding a subset of products that are compatible with the technical capabilities associated with the user;
retrieve the response from the cache based on determining that the cache stores the response; and
transmit the response.

16. The system of claim 15, where the subset request further includes third information that specifies a particular area that includes a location associated with the user.

17. The system of claim 16, where the second information further includes information regarding communication services currently being provided to the user.

18. The system of claim 16, where the request is received from a web server that provides an ordering mechanism to the user device.

19. The system of claim 16, where the one or more processors are further to:
receive another request;
determine that the cache does not store another response that satisfies the other request;
generate a retrieval request based on the other request; and
forward the retrieval request to a management server that stores information about products.

20. The system of claim 19, where the one or more processors are further to:
receive information regarding another subset of the products as a response to the retrieval request;
generate another response that satisfies the other request based on the information regarding the other subset of the products;
store the other response in the cache in association with data included in the other request; and
transmit the other response.

* * * * *